United States Patent [19]

Fougere et al.

[11] Patent Number: 5,626,737

[45] Date of Patent: May 6, 1997

[54] METHOD OF FABRICATING A HIGH POWER DENSITY ELECTROCHEMICAL CHARGE STORAGE DEVICE

[75] Inventors: Gretchen E. Fougere, Glencoe; Han Wu, Barrington; Ke K. Lian, Northbrook, all of Ill.

[73] Assignee: Motorola, Inc., Schaumburg, Ill.

[21] Appl. No.: 611,319

[22] Filed: Mar. 5, 1996

[51] Int. Cl.$^6$ .................................................. C25D 9/00

[52] U.S. Cl. ........................ 205/316; 205/333; 204/402; 429/223

[58] Field of Search ........................... 429/223; 204/402; 205/316, 333; 361/504, 508, 516

[56] References Cited

U.S. PATENT DOCUMENTS

| | | | |
|---|---|---|---|
| 4,935,111 | 6/1990 | Suzuki et al. | 205/316 |
| 5,429,895 | 7/1995 | Lian et al. | 429/223 |
| 5,560,752 | 10/1996 | Badding et al. | 205/316 |

Primary Examiner—Bruce F. Bell
Attorney, Agent, or Firm—Kenneth M. Massaroni

[57] ABSTRACT

High power density electrochemical capacitors may be pretreated by immersing the electrodes therefore in an alkaline solution. Thereafter the immersed electrode are subjected to high power pulses for brief periods of time. The pretreatment process forms an activated oxide layer on the electrode surface. The resulting device is capable of delivering high current pulses with enhanced discharge voltage.

11 Claims, 2 Drawing Sheets

METHOD OF FABRICATING A HIGH POWER DENSITY ELECTROCHEMICAL CHARGE STORAGE DEVICE

CROSS REFERENCE TO RELATED APPLICATIONS

This application is related to issued U.S. Pat. No. 5,429,895 issued Jul. 4, 1995, entitled Nickel Alloy Electrodes for Electrochemical Devices.

TECHNICAL FIELD

This invention relates in general to high power density electrochemical charge storage devices, and particularly to methods for fabricating electrodes for such devices.

BACKGROUND

As electronic devices increasingly become portable, advances must be made in energy storage devices to enable such portability. Indeed, it is often the case with current electronics technology that the limiting factor to portability of a given device is the size and the weight of the associated energy storage device. Obviously, a small energy storage device may be fabricated for a given electrical device application, but at the cost of energy capacity. Conversely, a large energy storage device yielding long life may be attached to an electronic device, but typically at the expense of size and portability. The result is that either the energy storage device is too bulky, too heavy, or does not last long enough for a given application. Typical energy storage devices used for portable electronics include the electrochemical battery cell, and, increasingly, the electrochemical capacitor.

Electrochemical capacitors are a class of devices characterized by relatively high power densities as compared with conventional battery systems. The charge mechanism of such capacitors is typically the result of primary, secondary, tertiary, and higher order oxidation/reduction reactions between the electrodes and the electrolyte of the capacitor.

Currently, there are few commercially available devices which can provide the high current pulses and high power density required for pulse communications, load leveling, and portable power tools, as well as electrochemical capacitors. This is due to the fact that such applications typically require high currents of several to 50 amperes for short time durations, i.e., on the order of 0.10 to 100 milliseconds. These device applications also require long cycle life, for example on the order of between $10^5$ and $10^8$ cycles and a wide temperature range during operation, i.e., on the order of $-30°$ to $60°$ C. Traditional battery cells do not have such long usable lives, particularly when subjected to pulse discharge conditions as are commonly experienced in the device applications described above. Conventional electrolytic capacitors have been explored for such applications, but are generally too large to meet the capacitance requirements.

Numerous new materials have been proposed for use in electrochemical charge storage capacitor devices. For example, a novel nickel-chromium-molybdenum based material is disclosed and claimed in previously mentioned U.S. Pat. No. 5,429,895. Such materials may be advantageously paired with appropriate counter electrodes such as, for example, with a zinc electrode, and an appropriate electrolyte disposed therebetween such as, for example, a polymeric matrix having dispersed therein a liquid or solid electrolyte active species, such as KOH.

Heretofore, in such devices, the nickel-chromium-molybdenum alloy electrode was activated by the KOH in the electrolyte after the cell had been assembled. However, as devices become increasingly large to handle larger power and energy density requirements, not all of the electrode material can be sufficiently activated, i.e., the surface of the electrode material was not sufficiently oxidized to generate a layer which would serve as the site for the primary, secondary, tertiary and higher order oxidation/reduction reactions which characterize the device performance. This is mainly due to the fact that there is insufficient KOH in the electrolyte, and hence insufficient $OH^-$ ions for both the development of the active oxide layer, and the oxidation/reduction reactions which occur during cycling.

Accordingly, there exists a need for a method of pretreating electrodes for high power density charge storage devices, to provide a sufficient surface oxide layer on the electrode surface. The pre-activation process should be relatively simple, inexpensive, and yield highly reliable, accurate results. Moreover, the process should not complicate the manufacturing process.

DETAILED DESCRIPTION OF THE PREFERRED EMBODIMENT

Figure 1:
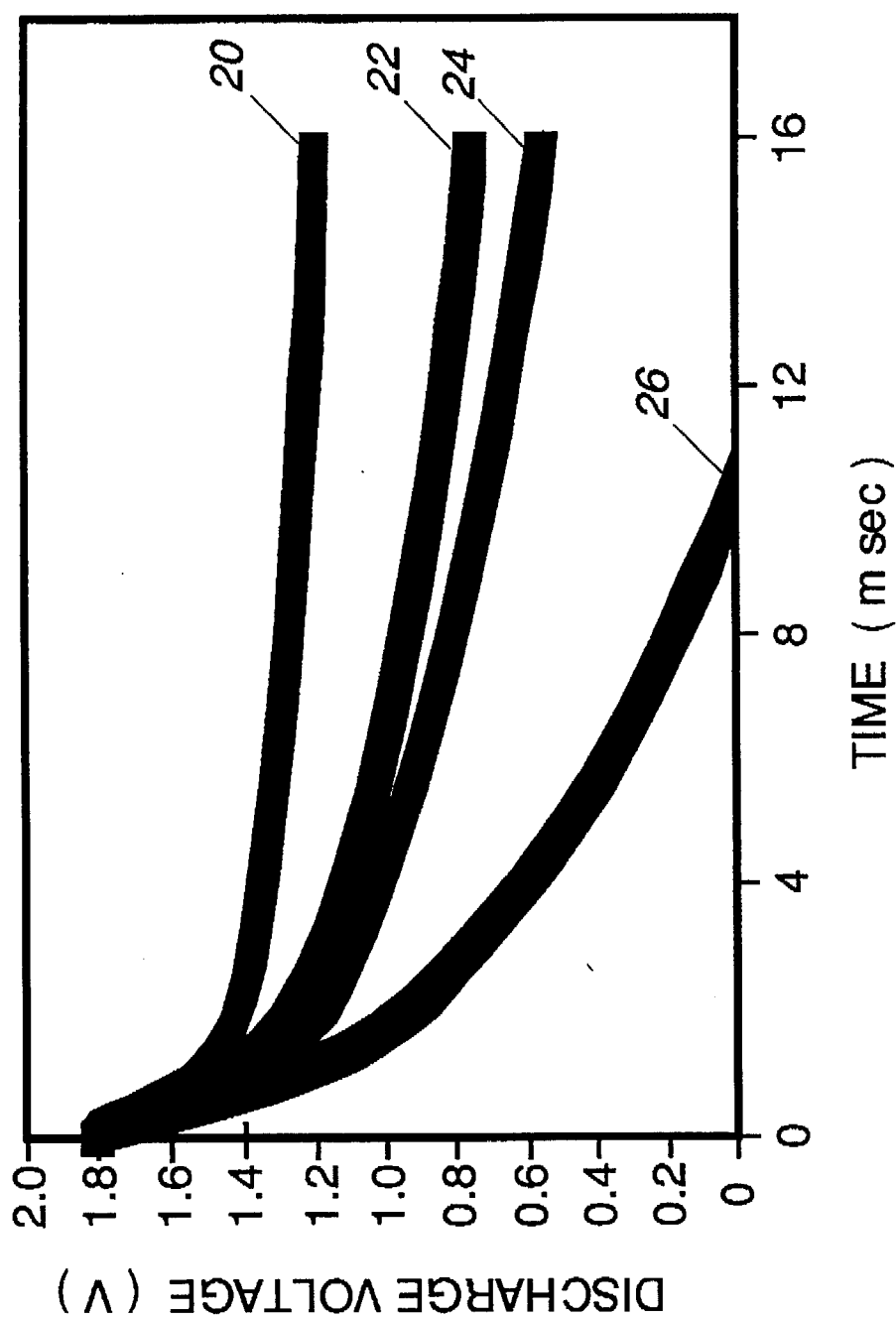
FIG. 1 is a series of discharge curves at different discharge currents for an untreated device.

While the specification concludes with claims defining the features of the invention that are regarded as novel, it is believed that the invention will be better understood from a consideration of the following description in conjunction with the drawing figures, in which like reference numerals are carried forward.

Electrodes for high power density electrochemical charge storage devices can be fabricated using nickel-chromium-molybdenum alloy material as disclosed and claimed in the aforementioned '895 patent. In order to fabricate relatively large size devices, i.e., on the order of greater than 40 square centimeters ($cm^2$) using the electrode material described in the '895 patent, it is necessary to pretreat or preactivate the electrode material prior to cell assembly. This is due to the fact that in typical polyvinyl alcohol ("PVA")/KOH gel electrolytes, there is not a sufficient amount of hydroxide ions for both the development of the active oxide layer and for the subsequent oxidation reduction charge storage reactions which take place during cycling. Accordingly, the electrode materials can be treated by subjecting them to an activation regime as described below.

Specifically, the electrode material is placed in the presence of a solution containing a sufficient amount of an ionic conducting solution selected from the group consisting of KOH, NaOH, LiOH, KCL, NaCl, $NH_3OH$, sulfates, nitrates, and combinations thereof. In one preferred embodiment, the activating or pre-treatment solution is the same as that used as the electrolyte active species, and is preferably KOH. KOH used to activate the electrode material is typically a 31 wt % solution of KOH in water. The electrode material is immersed in the activating solution, and thereafter relatively high DC currents are passed through the electrode material. As used herein, the currents are on the order of between 10 milliamperes, (mA)/$cm^2$ to 10 amps/$cm^2$ and preferably between 100 mA/$cm^2$ and 800 mA/$cm^2$. Current is applied to the electrode material for a period of time between 10 milliseconds and 10 minutes and preferably about 10–30 seconds.

As current is being passed through the electrode material, a surface oxide layer is generated which layer is the active layer for the oxidation/reduction reactions. If desired, ten or more potential cycles between, for example, 0 and 0.65 volts (with respect to an Hg/HgO reference electrode) can be run to estimate the capacity of the Ni/Cr/Mo electrode.

The invention may be better understood from a perusal of the examples which follow:

EXAMPLES

An electrochemical charge storage device, specifically an electrochemical capacitor was constructed by providing a first electrode fabricated of a nickel-chromium-molybdenum alloy material of approximately 0.002 inches thickness, and approximately 60 $cm^2$ of surface area. The electrode is roughened by sanding, blasting, etc., and then etched with a solution of 50 vol % HCl and 50 vol % $HNO^3$. The electrode is then cleaned ultrasonically in deionized water for 5 minutes. A zinc foil was prepared for use as the second electrode. Zinc foil having 99.9% purity and a thickness of about 0.005 inches was cut and sized to match the size of the nickel-chromium-molybdenum alloy material. The zinc foil was then cleaned with deionized water.

Disposed between the first and second electrodes was an electrolyte comprising a PVA solution of molecular weight distribution between 31,000 and 85,000 which was added to hot (approximately 50° C.) deionized water in a concentration of approximately 15 wt %. PVA in the lower molecular weight range provides the optimal viscosity and stability when a microporous polypropylene separator is used. Conversely, if no separator is needed, higher molecular weight PVA should be used to increase structural strength. The PVA solution was heated to about 60° C. and 31 wt % KOH was added dropwise to a suitable concentration in the range of 10–30 volume % while the PVA was being stirred.

Prior to cell assembly, the nickel-chromium-molybdenum alloy was preactivated. The electrode was placed against a separator soaked with 31 wt % KOH solution. The separator was polypropylene. Other suitable separators include porous materials of microporous membranes or nonwoven sheets, all of which may be selected from the group polyethylene, polypropylene, Teflon®, polysulfone, and cellulose, to name a few. A nickel screen was placed on the other side of the separator and used as a counter electrode. A mercury/mercury oxide (Hg/HgO) reference electrode was also employed.

Thereafter, a DC current of approximately 200 $mA/cm^2$ was passed through the electrode for approximately 10 seconds. The resulting electrode material was uniformly black in color, indicating the presence of a surface oxide layer. The material was then rinsed in deionized water and dried.

One surface of the electrode was coated with the PVA/KOH electrolyte and then covered with a polypropylene separator having a thickness of approximately 0.001 inches, and which had been sized to the electrodes. The separator was then coated with PVA/KOH electrolyte, which was then applied to the zinc electrode. The thickness of this single cell was 0.015 inches. The device was then heat sealed in a polymeric enclosure, and sealed with epoxy around the electrode leads. The seal is hermetic in order to prevent the electrolyte from drying out in the presence of ambient conditions.

Figure 2:
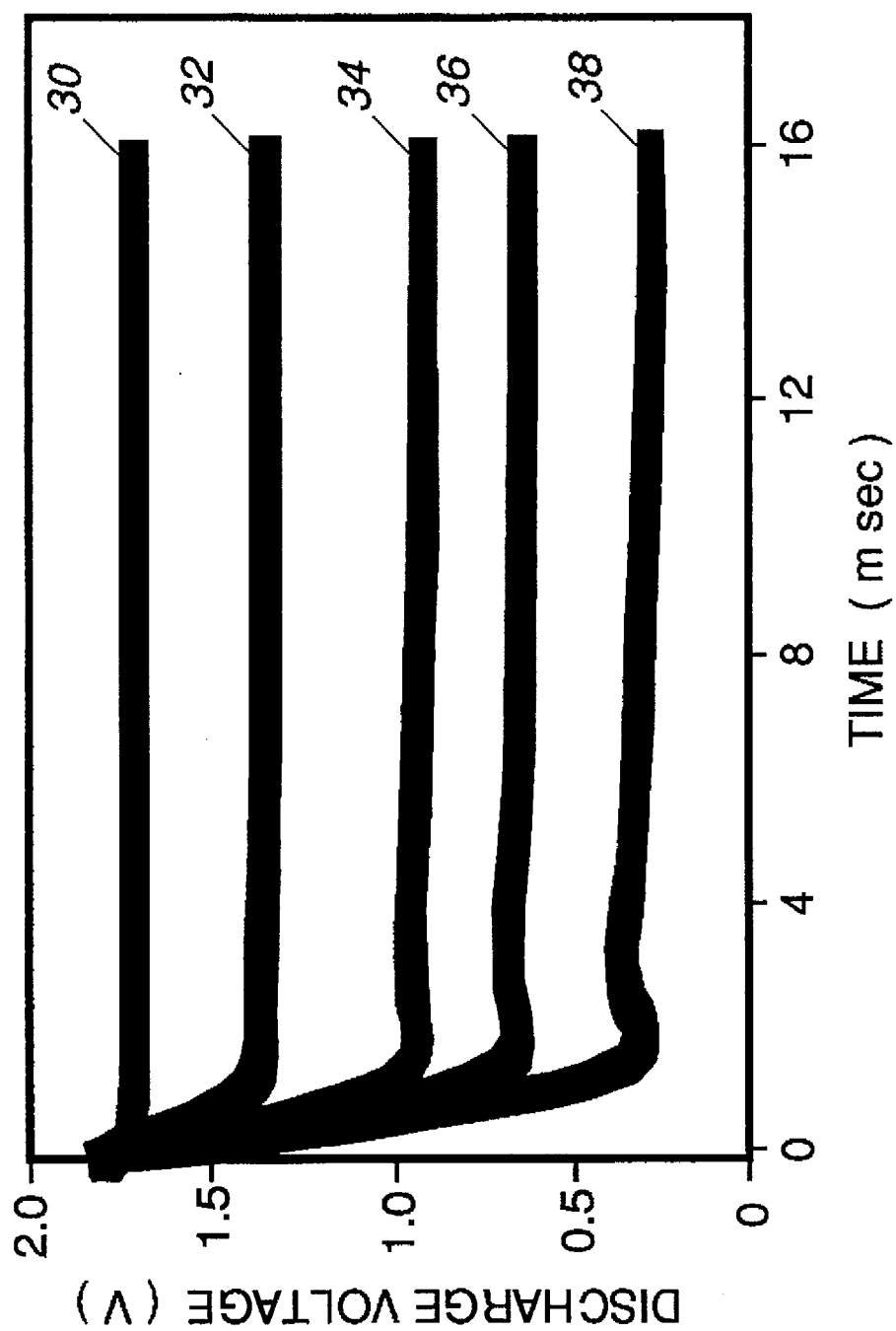
FIG. 2 is a series of discharge curves at different discharge currents for a device treated in accordance with the instant invention.

Referring now to FIGS. 1 and 2 there is illustrated therein the discharge voltage profile for the device described hereinabove, (illustrated in FIG. 2) and it is compared to a device in which no preactivation regime is used (illustrated in FIG. 1). It is to be understood that the devices used to generate FIGS. 1 and 2 were identical, except that the devices of FIG. 1 was untreated, while that of FIG. 2 was treated as described above. In each case, the test devices were discharged at different current levels. Accordingly, in FIG. 1, the untreated device was discharged at 2, 2.5, 3, and 4 amps illustrated respectively at lines 20, 22, 24 and 26. As may be appreciated from perusal of FIG. 1, when discharged at 4 amps, the discharge voltage reached 0 volt in approximately 10 milliseconds. Further, at the other discharge currents, it is clear that the discharge voltage is falling rapidly by 12 milliseconds. Conversely, and referring now to FIG. 2, there is illustrated therein the discharge of a similar device which was discharged at 1, 5, 7, 10, and 14 amps, illustrated by lines 30, 32, 34, 36, and 38 respectively. As may be appreciated from a perusal of FIG. 2, discharge voltage, after experiencing an initial sharp dropoff remained substantially flat out to 10 milliseconds. Indeed, even under the relatively heavy discharge current of 14 amps, illustrated by line 38, discharge remained fairly consistent at 0.2 volts to 16 milliseconds. Accordingly, it may concluded that the preactivation process considerably enhances the performance characteristics of devices subjected to the treatment.

The device disclosed hereinabove has been tested for cycle life, and has continued to work to over 2.6 million cycles under 58 $mA/cm^2$ and 16 millisecond discharge conditions. Device testing was stopped at 2.6 million cycles without device failure. This long cycle life is surprising in that it is well known that redox reactions associated with the charge and discharge cycling cause shape changes in the zinc electrode. Shape changes occur with the development of zinc dendrites which ultimately can cause the cell to fail via shorting between the electrodes.

While the preferred embodiments of the invention have been illustrated and described, it will be clear that the invention is not so limited. Numerous modifications, changes, variations, substitutions and equivalents will occur to those skilled in the are without departing from the spirit and scope of the present invention as defined by the appended claims.

What is claimed is:

1. A method of activating an electrode for a high power density charge storage device, said method comprising the steps of:

providing an electrode consisting of nickel-chromium-molybdenum based alloy material;

immersing said electrode in an ionic conducting solution for forming an oxide layer on the surface of said electrode; and passing a current through said electrode.

2. A method as in claim 1, wherein said current is between 10 $mA/cm^2$ and 10 $Amps/cm^2$.

3. A method as in claim 1, wherein said current is between 100 $mA/cm^2$ and 800 $mA/cm^3$.

4. A method as in claim 1, wherein said current is a direct current.

5. A method as in claim 1, wherein said ionic conducting solution is selected from the group consisting of KOH, NaOH, LiOH, KCl, NaCl, $NH_3OH$, sulfates, nitrates, and combinations thereof.

6. A method as in claim 1, wherein said oxidizing solution is KOH.

7. A method of forming an electrode for a high power density electrochemical charge storage device, said method comprising the steps of:

provided an electrode consisting of a nickel/chromium/molybdenum based alloy material;

immersing said electrode in a ionic conducting solution selected from the group consisting of KOH, NaOH, LiOH, KCl, NaCl $NH_3OH$, sulfates, nitrates, and combinations thereof, for forming an oxide layer on the surface of said electrode; and passing a current through said electrode.

8. A method as in claim 7, wherein said current is between 10 $mA/cm^2$ and 10 $amps/cm^2$.

9. A method as in claim 7, wherein said current is between 100 $mA/cm^2$ and 800 $mA/cm^2$.

10. A method as in claim 9, wherein said current is a direct current.

11. A method as in claim 7, wherein said ionic conducting solution is KOH.

* * * * *